(12) United States Patent
Magnusson

(10) Patent No.: US 6,182,413 B1
(45) Date of Patent: Feb. 6, 2001

(54) ENGINEERED HARDWOOD FLOORING SYSTEM HAVING ACOUSTIC ATTENUATION CHARACTERISTICS

(75) Inventor: Tryggvi Magnusson, Knislinge (SE)

(73) Assignee: Award Hardwood Floors, L.L.P., Wausau, WI (US)

( * ) Notice: Under 35 U.S.C. 154(b), the term of this patent shall be extended for 0 days.

(21) Appl. No.: 09/362,167

(22) Filed: Jul. 27, 1999

(51) Int. Cl.$^7$ ...................................................... E04B 2/08
(52) U.S. Cl. ...................... 52/589.1; 52/309.8; 52/592.1
(58) Field of Search ................... 52/309.8, 589.1, 52/592.1, 313; 428/137, 138, 172, 542.2

(56) References Cited

U.S. PATENT DOCUMENTS

| | | | |
|---|---|---|---|
| 3,551,270 | 12/1970 | Sharkey | 161/113 |
| 3,567,563 | 3/1971 | Haudenchild et al. | 161/37 |
| 3,579,941 | * 5/1971 | Tibbals | 52/384 |
| 4,567,087 | 1/1986 | O'Dell et al. | 428/211 |
| 4,880,680 | 11/1989 | Kistner | 428/74 |
| 5,238,260 | 8/1993 | Scherübl | 280/610 |
| 5,706,621 | * 1/1998 | Pervan | 52/403.1 |
| 5,879,781 | 3/1999 | Mehta et al. | 428/137 |
| 5,894,700 | * 4/1999 | Sweet | 52/391 |
| 5,983,584 | * 11/1999 | Staten et al. | 52/309.8 |

OTHER PUBLICATIONS

Award Hardward Floors Brochure No. ML1550/032898/100M/ORG/DB.
QS 3.0 Quiet System Underlayment, Award Hardwood Floors, admitted prior art.

* cited by examiner

Primary Examiner—Bruce A. Lev
(74) Attorney, Agent, or Firm—Andrus, Sceales, Starke & Sawall

(57) ABSTRACT

An engineered hardwood flooring system includes tongue and groove core planks, each having a hardwood top plate glued to the top surface of the core plank. The hardwood top plate is made by gluing thin strips of hardwood to form a planar top plate which is attached to the core plank. The hardwood top plate is coated with a polyurethane finish or the like to protect the luster and beauty of the hardwood. The core plank includes a plurality of holes extending completely through the core plank from a top surface of the core plank to a bottom surface of the core plank. The holes are spaced apart and arranged in a pattern consisting of alternating staggered rows of holes. The purpose of the holes in the core plank is to attenuate acoustic energy propagating within the core plank, and thereby reduce the level of noise caused when people walk on the floor.

11 Claims, 3 Drawing Sheets

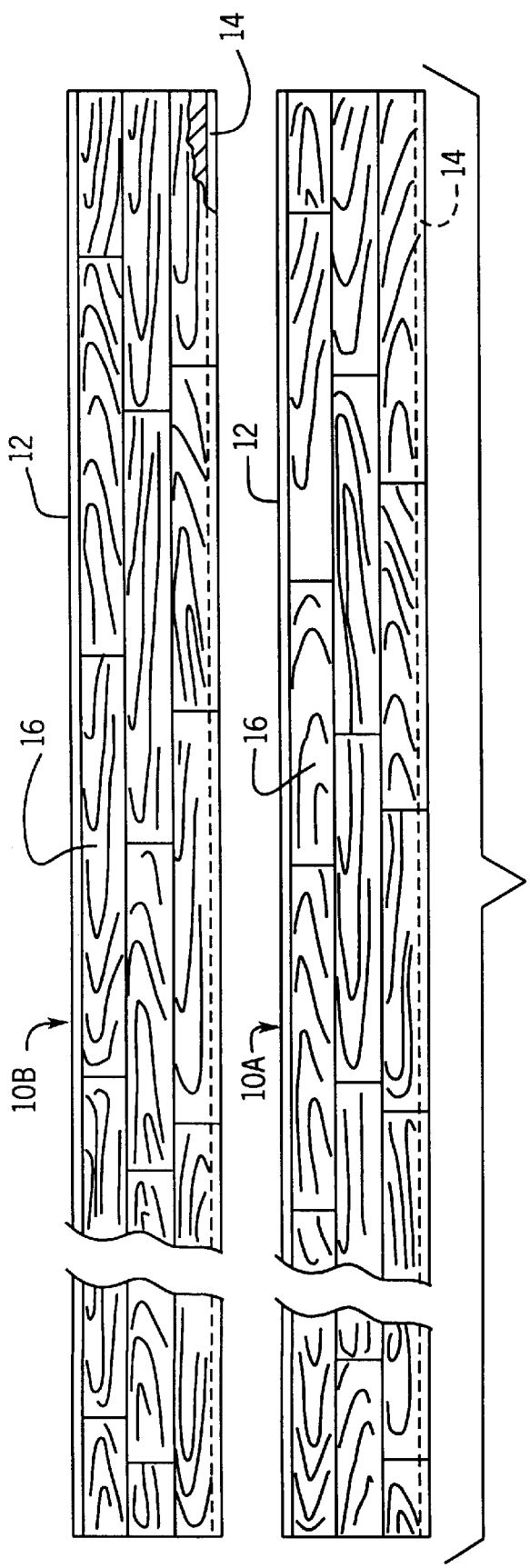
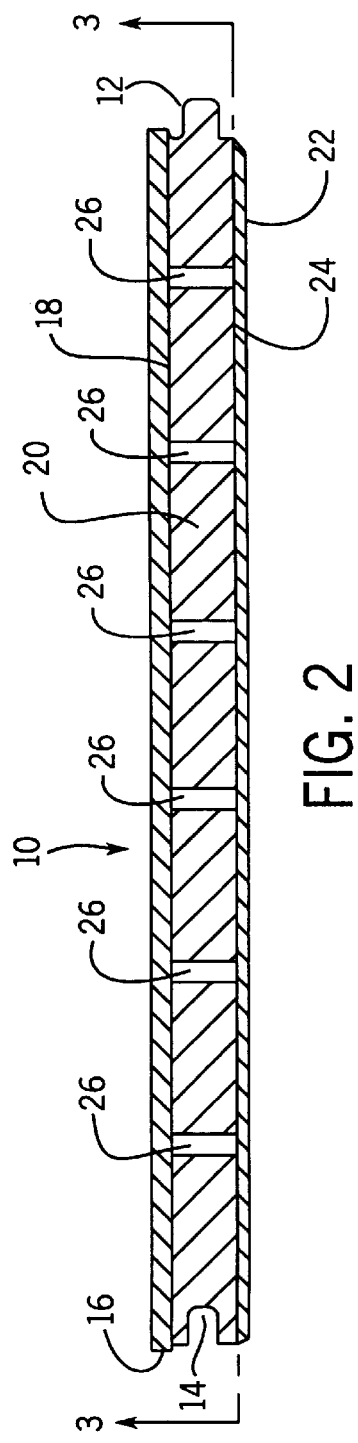
FIG. 1
FIG. 2

ENGINEERED HARDWOOD FLOORING SYSTEM HAVING ACOUSTIC ATTENUATION CHARACTERISTICS

FIELD OF INVENTION

The invention relates to engineered hardwood flooring systems. In particular, the invention relates to flooring systems having a hardwood top plate and a core plank which is perforated to muffle or attenuate sound caused by people walking on the floor.

BACKGROUND OF THE INVENTION

Engineered hardwood flooring has a relatively thin hardwood top plate (e.g. about ⅛ of an inch) glued to a top surface of a core plank. The core plank is typically about six inches wide and about seven or eight feet long. It is typically ¼ to ½ inch thick, and normally made of plywood, fiberboard, particle board, lumber board, OSB. The top of the hardwood top plate is coated with a polyurethane or similar finish to protect the luster and beauty of the hardwood. The core plank has tongue and groove construction to facilitate installation. The hardwood top plate is manufactured by gluing and clamping two inch wide hardwood strips to form a planar surface. The hardwood top plate is then glued to a top surface of the core plank. A backing layer (e.g., wood fiber, hardwood, softwood, veneer, paper, etc.) is normally glued to the bottom of the core plank to balance the core and prevent warping. The backer also helps to seal the core plank from moisture, and help maintain structural integrity of the floor.

While plastic laminate floors can be convenient to install, the noise and appearance of repetitive printed wood grain images of such floors is not particularly appealing to many consumers. On the other hand, engineered hardwood flooring provides the luster and beauty of hardwood floors, yet is typically less expensive and more convenient to install than conventional hardwood floors. Engineered hardwood flooring is typically installed to float over the sub-floor, although it can also be attached to the sub-floor. In order to make engineered hardwood floors more comfortable to walk on and quieter, it is known in the art to provide a foam underlayment on the sub-floor before installing the engineered hardwood floor. It has been found that foam underlayments dampen floor vibrations, and reduce decibel level and duration of both low frequency impact noise (such as the sound of walking across the floor) and high frequency room noise. When used on a second story room, the foam underlayment also reduces sound transmission through the floor/ceiling into the room below. While foam underlayments often work well, it is not always practical to use foam underlayment when installing an engineered hardwood floor.

In many applications, it would be desirable for the engineered hardwood flooring plank to have inherent sound attenuation characteristics.

SUMMARY OF THE INVENTION

The invention is engineered hardwood flooring in which the core tongue and groove plank has perforations or holes extending completely through the core plank from a top surface of the plank to a bottom surface of the plank. The perforations or holes are preferably positioned in staggered rows. After acoustic energy propagates through the hardwood top plate into the core, the energy disperses in all directions within the core plank. Inasmuch as the acoustic energy normally has a component propagating laterally in the core plank, the energy will eventually encounter one of the perforations or holes in the core board. The perforations or holes attenuate the acoustic energy, thereby muffling the sound.

By staggering the perforations or holes as shown in the drawings, a vast majority of acoustic energy propagating through the core plank will intersect a perforation or hole within a relatively short distance, thus effectively attenuating the energy before it is able to return into the room as sound. In order to be effective, it is important that the perforations or holes extend completely through the core plank from its top surface to its bottom surface. Otherwise, substantial amounts of acoustic energy will be able to propagate within the core plank for substantial distances without encountering a perforation or hole to attenuate the energy.

Other features of the invention may be apparent to those skilled in the art upon inspecting the drawings and the following description thereof.

BRIEF DESCRIPTION OF THE DRAWING

FIG. 1 is a top plan view of planks of engineered hardwood flooring constructed in accordance with the invention.

FIG. 2 is a cross-sectional view of a plank of engineered hardwood flooring showing a row of acoustic attenuating holes, each passing completely through the core section of the long plank.

DETAILED DESCRIPTION OF THE DRAWINGS

Figure 1A:
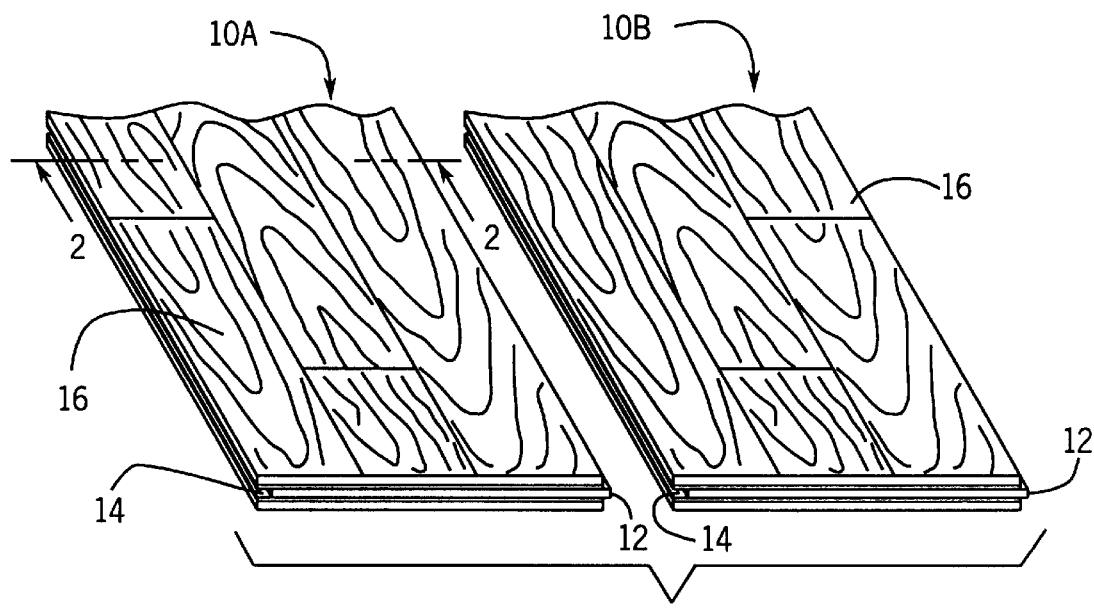
FIG. 1A is a partial perspective view of the planks shown in FIG. 1.

FIGS. 1 and 1A show two planks 10a, 10b of engineered hardwood flooring. The planks 10a, 10b are typically about 7 inches wide and 7 feet long. The planks 10a, 10b have tongue 12 and groove 14 construction to facilitate convenient installation. It is desirable that the planks 10a, 10b have uniform board height and tight plank-to-plank fit along the tongues 12 and grooves 14 to eliminate raised edges when the floor is installed. The planks 10a, 10b are typically sold in boxes containing six to eight boards which would normally be sufficient to cover 22–28 square feet of flooring.

Referring now to FIGS. 1, 1A and 2, each plank of engineered hardwood flooring 10, 10a, 10b is manufactured by gluing a hardwood top plate 16 on a top surface 18 of a core plank 20, and a hardwood backer 22 to a bottom surface 24 of the core plank 20. The hardwood plate 16 is manufactured from hardwood blocks which are cut and sanded to a desired size, preferably approximately ⅛ inch thick, 2 and 9/16 inches wide, and 14 inches in length. The hardwood strips are preferably plain sawn out of the length of hardwood blocks in board fashion, rather than peeled from the circumference of the log which is known as veneer fashion. The thin hardwood strips are placed in a planar array, and glue is applied to the edges of adjacent thin hardwood strips.

The thin hardwood strips are then compressed to form a hardwood plate, which provides a planar hardwood top surface for the engineered hardwood flooring plank 10. The hardwood plate 16 can be made of any type of hardwoods typically used on floors, such as birch, ash, maple, oak, walnut, hickory, jatoba, cherry, etc. When making the hardwood plate 16, it is important to accurately control the appearance and smoothness of the hardwood plate 16 inasmuch as the hardwood top plate 16 is exposed when the flooring 10 is in use.

A coating or finish is preferably applied to the top surface of the hardwood top plate 16 in order to protect the luster and beauty of the floor 10. The preferred finish and method of applying the same is disclosed in copending U.S. patent application Ser. No. 09/190,683, entitled "Multi-Layered, Ceramic-Based Hardwood Finish" filed on Nov. 12, 1998. The preferred finish is a ceramic-based, polyurethane, UV-hardened, clear finish which has a medium gloss appearance. One advantage of engineered hardwood floors compared to plastic laminate floors is that the top hardwood plate 16 can be sanded and refinished if necessary or desired.

The core plank 20 preferably consists of soft wood or fiberboard cut into boards which are approximately 7⅜ inches wide, ¼ to ½ inch high, and 7 feet long. The material of the core plank 20 is preferably medium density fiberboard or lumber board. Alternatively, the core plant 20 can be made of high density fiber board, particle board, OSB, or even suitable plastic materials. The backer 22 is preferably a relatively thin piece of rough cut hardwood (e.g. about 3/16 of an inch thick) which is glued to the bottom surface 24 of the core plank 20, although other backing materials can be used such as softwood, wood fiber, veneer, paper, etc. When using hardwood, the hardwood backer 22 for each plank 10 is preferably a single piece and not constructed from a plurality of hardwood strips as is the hardwood top plate 16. The purpose of the backer 22 is to balance the floor plank 10 to prevent warping, and also to provide structural stability to the floor plank 10. The hardwood top plate 16 is preferably glued to essentially the entire top surface 18 of the core plank 20 from edge to edge; and, the backer 22 is preferably glued to essentially the entire bottom surface 24 of the core plank 20 from edge to edge. If the core plank is made of soft wood such as lumber board or plywood, it is preferred that the direction of the grain in the core plank 20 be placed perpendicular to the direction of the grain of the hardwood top plate 16 and the hardwood backer 22. After the hardwood top plate 16 and the backer 22 are attached to the core plank 20, the tongue 12 and groove 14 are machined into lateral edges 32, 34 of the core plank 20. The hardwood top plate 16 is then sanded and cleaned for sealing and finishing.

Figure 3:
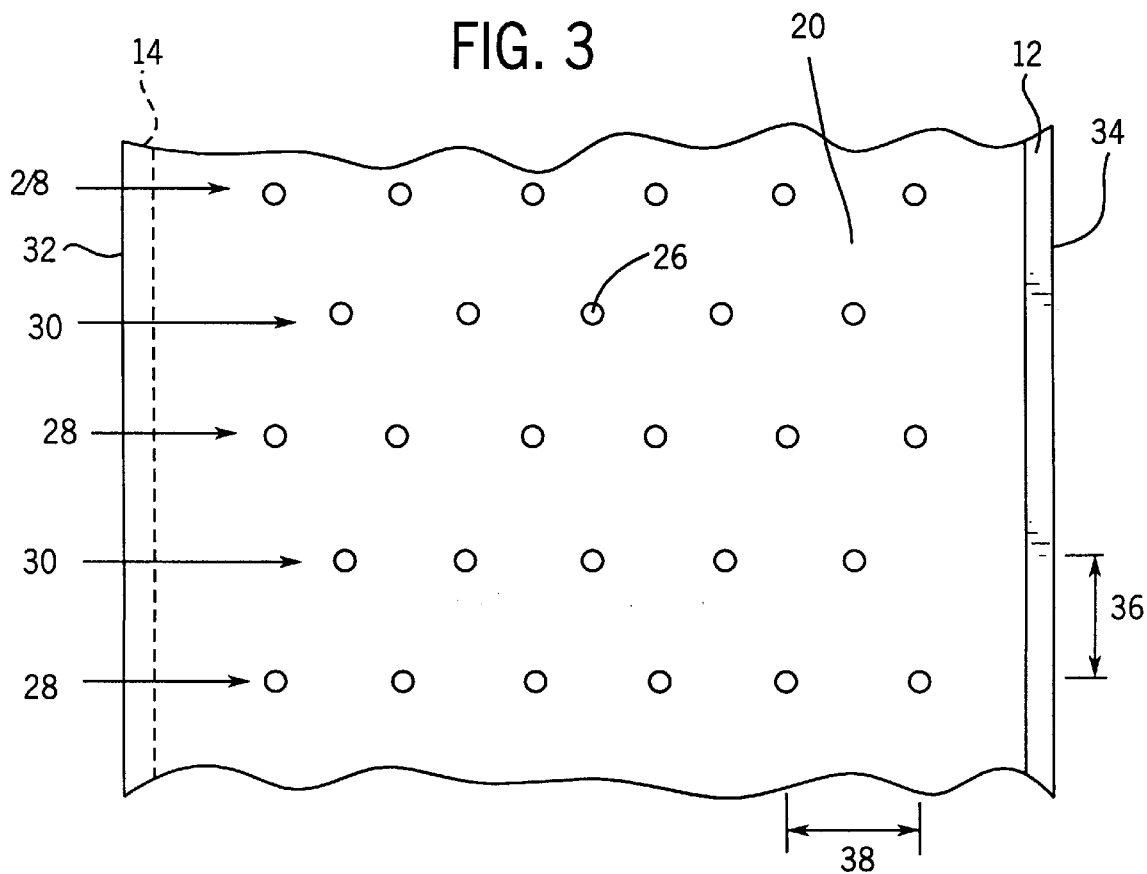
FIG. 3 is a partial top planar view of a core plank used in accordance with the invention which illustrates the preferred pattern of acoustic energy attenuating holes through the core plank.

In accordance with the invention, the core plank 20 contains a plurality of perforations 26 or holes 26 that extend completely through the core plank 20 from the top surface 18 of the core plank 20 to the bottom surface 24 of the core plank 20. As shown best in FIG. 3, the holes 26 are preferably cylindrical, and preferably spaced-apart and arranged in a pattern effective for attenuating acoustic energy propagating in the core plank 20. The diameter of the cylindrical holes 26 should be in the range between 1/16 of an inch to ¼ of an inch, and is preferably about ⅛ of an inch.

The acoustic attenuation holes 26 are preferably arranged in alternating staggered rows such as rows 28, 30. The rows designated by reference numeral 28 in FIG. 3 preferably consists of six holes 26 that are aligned perpendicularly between lateral edges 32, 34 of the core plank 20. The holes 26 in the core plank 20 are spaced apart from adjacent holes 26 in the row 28 equidistant from one another, preferably about 1 inch. The rows designated by reference numeral 30 also contains holes 26 that are preferably aligned perpendicularly between the lateral edges 32, 34 of the core plank 20. The rows 30 of holes 26 preferably consist of five acoustic attenuating holes 26. The location of the holes 26 in rows 30 is staggered with respect to the holes in row 28, preferably symmetrically. It is preferred that the distance between adjacent staggered rows 28, 30 be spaced apart a distance 36 that is essentially the same distance 38 as adjacent holes 26 within each row 28, 30. It has been found that the above-described pattern is particularly effective in attenuating acoustic energy propagating within the core plank 20 and reducing noise levels when people walk on the installed floor 10.

Figure 4:
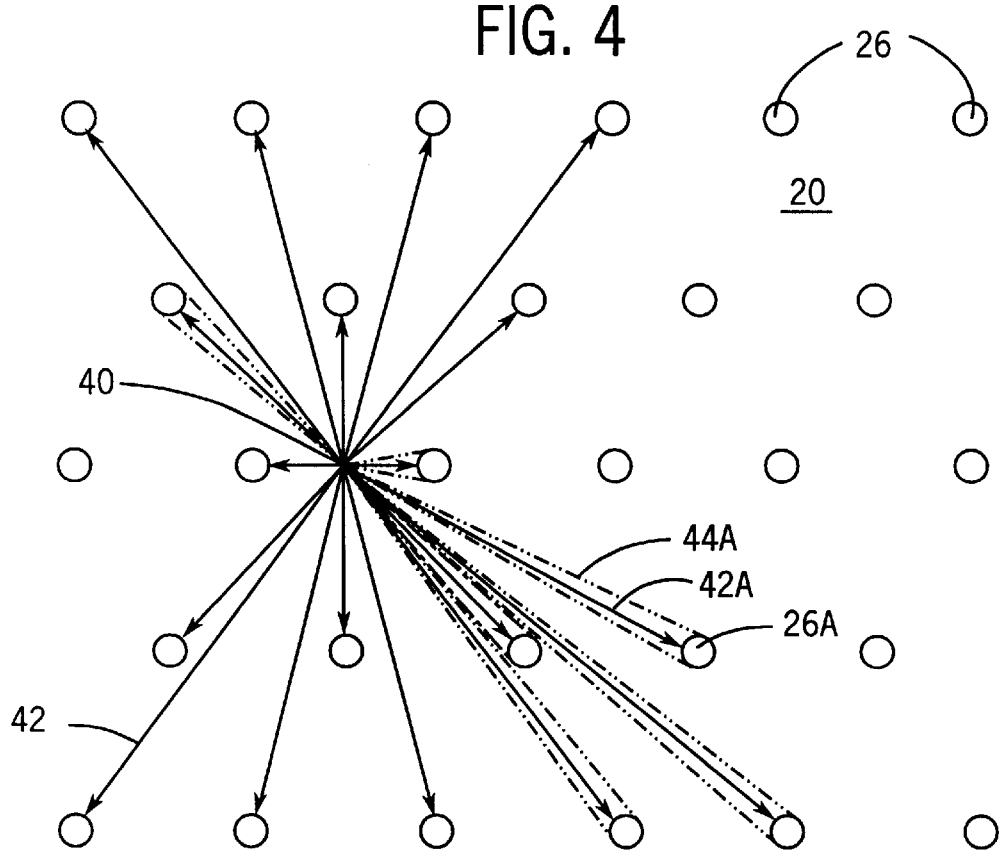
FIG. 4 is a schematic view illustrating attenuation laterally propagating components of acoustic energy within the core plank.

FIG. 4 illustrates the manner in which the holes 26 attenuate acoustic energy propagating within the core plank 20. In FIG. 4, reference number 40 refers to a location in the core plank 20 which is the source of acoustic energy, such as the location in the core plank 20 underneath the location in which a person's shoe impacts the floor 10. Acoustic energy from the impact is transmitted in part through the hardwood top plate 16 and into the core plank 20. FIG. 4 shows a plurality of vectors 42 emanating from source 40. The vectors 42 represent lateral components of acoustic energy propagating within the core plank 20. Note that the acoustic energy will disperse from the source 40 in all lateral directions. Referring in particular to acoustic attenuation hole 26a in FIG. 4, acoustic energy propagating from the source 40 towards the hole 26a in the direction of vector 42a is represented by shaded zone 44a. The energy propagating from acoustic source 40 within zone 44a will intersect hole 26a and be attenuated by hole 26a. Inasmuch as acoustic energy propagating laterally from acoustic source 40 is destined to intersect with one of a large number of holes 26 within relatively close proximity of the acoustic source 40, a majority of the acoustic energy transmitted to the core plank 20 is attenuated or muffled within the core plank 26, thereby reducing acoustic transmission to the surrounding environment and sound levels when a person walks on the floor 10. Note that it is particularly important that the holes 26 extend completely through the core plank 12 from its top surface 18 to its bottom surface 24 in order to prevent acoustic energy from bypassing the acoustic attenuation holes 26 when propagating laterally (or laterally in part) within the core plank 20.

Figure 5:
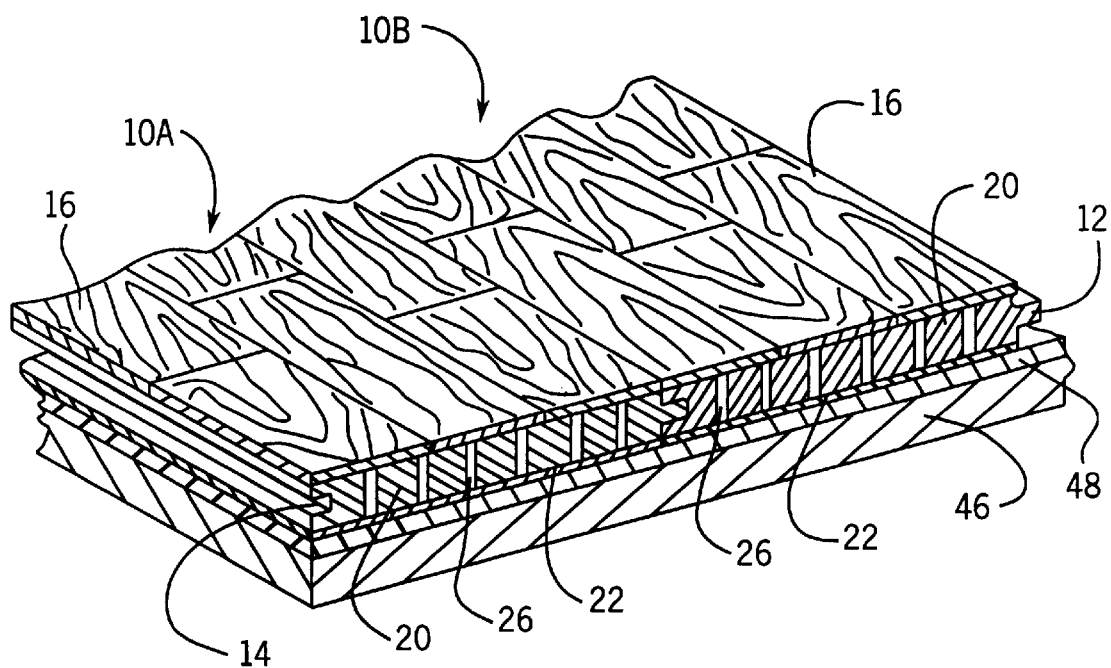
FIG. 5 is a schematic view illustrating the preferred method of installing long plank engineered hardwood flooring.

FIG. 5 illustrates the preferred method of installing engineered hardwood flooring planks 10a, 10b. Preferably, the planks 10a, 10b are installed over a sub-floor 46 with a foam underlayment layer 48 therebetween. The foam underlayment 48 further facilitates attenuation of acoustic energy, and also cushions the floor 10a, 10b on the sub-floor 46. The foam underlayment is preferably about 3 millimeters thick, and can accommodate small irregularities in the sub-floor 46. The foam underlayment can also help protect the floor 10a, 10b from sub-floor moisture.

The invention has been described above in connection with a preferred embodiment of the invention, however, the invention should not be limited thereto. The scope of the invention should be interpreted by referring to the following claims which particularly point out and distinctly claim the invention.

I claim:

1. An engineered hardwood flooring system comprising a plurality of planks, each plank comprising:

a core plank having tongue and groove construction along its lateral edges, the core plank having a top surface and a bottom surface and containing a plurality of holes extending completely through the core plank from the top surface to the bottom surface, said holes being arranged in a pattern for attenuating acoustic energy propagating in the core plank;

a hardwood top plate attached to the top surface of the core plank, the hardwood top plate comprising strips of thin hardwood glued together to form a planar hardwood plate; and a backing layer attached to the bottom surface of the core plank; and wherein the engineered hardwood flooring system further comprises a foam underlayment which is located underneath the backing layer and which cushions the planks when the engineered hardwood flooring system is installed over a sub-floor.

2. The invention as recited in claim 1 wherein the pattern of holes consist of spaced-apart holes arranged in alternating staggered rows through the core plank.

3. The invention as recited in claim 2 wherein the spaced-apart holes in each row are equally spaced from one on another.

4. The invention as recited in claim 3 wherein adjacent holes in each row are aligned perpendicularly to lateral edges of the core plank and are spaced apart from each other essentially the same distance than adjacent staggered rows are spaced apart from each other.

5. The invention as recited in claim 2 wherein the pattern of holes includes:

a first type of row of holes which are aligned perpendicularly between lateral edges of the core plank, said first type of row of holes consisting of five holes; and a second type of row of holes which are aligned perpendicularly between lateral edges of the core plank, said second type of row of holes consisting of six holes.

6. The invention as recited in claim 1 wherein the core plank is medium density fiberboard.

7. The invention as recited in claim 1 wherein the core plank is lumber board.

8. The invention as recited in claim 1 wherein the thickness of the hardwood top plate is within the range of ½ of an inch to ⅜ of an inch.

9. The invention as recited in claim 1 wherein each of the holes is a cylindrical hole.

10. The invention as recited in claim 9 wherein the diameter of the cylindrical holes is in the range between 3/16 of an inch to ¼ of an inch.

11. The invention as recited in claim 1 wherein a protective coating is applied on the hardwood top plate to protect the floor.

* * * * *